(12) United States Patent
Doria et al.

(10) Patent No.: US 6,718,945 B2
(45) Date of Patent: *Apr. 13, 2004

(54) MULTICYLINDER PETROL ENGINE WITH VARIABLE ACTUATION OF THE VALVES

(75) Inventors: Vittorio Doria, Orbassano (IT); Marco Lucatello, Orbassano (IT)

(73) Assignee: C.R.F. Societa Consortile per Azioni, Turin (IT)

( * ) Notice: Subject to any disclaimer, the term of this patent is extended or adjusted under 35 U.S.C. 154(b) by 0 days.

This patent is subject to a terminal disclaimer.

(21) Appl. No.: 10/259,528

(22) Filed: Sep. 30, 2002

(65) Prior Publication Data

US 2003/0111047 A1 Jun. 19, 2003

(30) Foreign Application Priority Data

Dec. 18, 2001 (IT) ....................................... TO2001A1187

(51) Int. Cl.[7] ................................................. F02B 15/00
(52) U.S. Cl. ................. 123/432; 123/90.16; 123/198 F
(58) Field of Search ........................... 123/90.15, 90.12, 123/90.16, 90.46, 90.56, 90.63, 322, 432, 198 F (56) References Cited

U.S. PATENT DOCUMENTS

| | | | | | |
|---|---|---|---|---|---|
| 5,363,816 | A | * | 11/1994 | Yorita et al. ............. | 123/90.12 |
| 6,237,551 | B1 | * | 5/2001 | Macor et al. ............ | 123/90.15 |
| 6,439,195 | B1 | * | 8/2002 | Warner ...................... | 123/321 |
| 6,447,273 | B1 | * | 9/2002 | Nishimura et al. ......... | 417/505 |
| 6,530,759 | B2 | * | 3/2003 | Sano et al. ................ | 417/470 |
| 6,553,950 | B2 | * | 4/2003 | Chiappini et al. ........ | 123/90.12 |
| 6,581,573 | B2 | * | 6/2003 | Nimura et al. ............. | 123/496 |

* cited by examiner

Primary Examiner—John Kwon
(74) Attorney, Agent, or Firm—Sughrue Mion, PLLC (57) ABSTRACT

A multicylinder petrol engine is provided with a hydraulic system for variable actuation of the valves, which enables easy control of operation of the engine according to different strategies. The engines according to the invention is, in particular, able to operate with a variable engine displacement in a modular way via the exclusion of selected cylinders, to control combustion by adjustment of the effective compression ration, and to control re-circulation of the exhaust gases at intake, in order to achieve low levels of consumption and reduced harmful exhaust emissions.

5 Claims, 7 Drawing Sheets

Fig_1

Fig_1A

Figura 2

Figura 3

Figura 4

Figura 5

Figura 6

Figura 7

Figura 8

Figura 9

Figura 10

Figura 11

MULTICYLINDER PETROL ENGINE WITH VARIABLE ACTUATION OF THE VALVES

BACKGROUND OF THE INVENTION

The present invention relates to multicylinder petrol engines provided with a system for variable actuation of the valves.

The applicant has already proposed, in its U.S. Pat. No. 6,237,551, an internal-combustion engine of the type comprising:

- at least one intake valve and at least one exhaust valve for each cylinder, each valve being provided with respective elastic return means, which push the valve towards a closed position for controlling respective intake and exhaust pipes; and
- at least one camshaft, for actuating the intake and exhaust valves of the engine cylinders by means of respective tappets;
- in which each intake valve is controlled by the respective tappet against the action of the aforesaid elastic return means by interposition of hydraulic means that include a pressurized fluid chamber;
- said pressurized fluid chamber being designed to be connected by means of a solenoid valve to an exhaust channel in order to uncouple the valve from the respective tappet and bring about fast closing of the valve as a result of the respective elastic return means;
- electronic control means for controlling each solenoid valve so as to vary the time and the opening stroke of the respective intake valve according to one or more operating parameters of the engine.

SUMMARY OF THE INVENTION

The purpose of the present invention is to further improve the previously proposed engine in order to provide a petrol engine that affords a series of advantages as regards control of combustion, reduction of consumption, reduction of harmful exhaust gases, and, in general, improvement of efficiency of the engine.

With a view to achieving the above purpose, the subject of the present invention is a petrol engine of the known type referred to above, characterized in that:

- the engine is provided with second electronic control means for keeping the exhaust valves closed;
- the aforesaid electronic control means are pre-arranged for keeping the intake valves of one or more selected cylinders of the engine closed during the normal operating cycle, simultaneously with the activation of the aforesaid second means, which keep the exhaust valves of said selected cylinders closed, so as to inhibit operation of said selected cylinders, thus obtaining an engine with displacement that can be varied with modularity.

It should be considered that the concept of modularity, taken in itself, in petrol engines is known. The de-activation of one or more cylinders of the engine is performed, in general, to achieve a reduction in specific consumption, thanks to a decrease in the work of pumping of the cylinders that are not in the combustion phase, and a decrease in the organic losses, combined with an improvement in combustion efficiency. In this way, a variation in engine displacement, which is controlled according to the torque requirement of the vehicle, is obtained.

The system according to the invention enables adjustment of engine load without the use of a throttle valve and, in itself, thus tends to minimize pumping losses. In addition to the above advantage, the system according to the invention, which envisages simultaneous closing both of the intake valves, via a hydraulic system of variable control of the valves, and of the exhaust valves, enables the aforesaid result to be achieved with higher efficiency using relatively simple and inexpensive means. The aforesaid means, which are designed to keep the exhaust valves closed, may be obtained in any known way, for example, by means of tappets of the so-called "collapsible" type, produced by the German firm INA.

In the case where the engine has an even number of cylinders, modularity is obtained, according to the invention, by de-activating one half of the cylinders of the engine. In this way, a number of disadvantages are achieved: given the same mean effective pressure (MEP) of the engine, an MEP of the active cylinder is found to be twice as high. This determines an improvement in the combustion efficiency of the cylinders in firing, with a consequent reduction in specific consumption. By de-activating one half of the cylinders, also a reduction in losses due to friction is obtained. This result is justified by the fact that, in the modular configuration, there is no longer any absorption caused by the cycles of compression and release of the springs of the intake valves and by the fact that the loads acting on the crank mechanism, on the pistons, and on the corresponding segments are considerably reduced. Owing to the fact that, in the modular configuration, also the exhaust valves are closed, there is further obtained a greater reduction in losses due to friction, in so far as, added to the reduction in losses due to friction on account of closing of the intake valves, there is the reduction in losses corresponding to the de-activation of the exhaust valves, whilst, above all, the increase in losses due to pumping, which is proper to the modularity obtained with just the inhibition of the intake valves, does not occur.

In the case where the number of cylinders of the engine is odd, the system envisages an inhibition of operation, by turns, of all the cylinders of the engine. In fact, if the aim is to maintain uniformity of staggering between the individual combustion phases, in order to obtain a balanced engine, it is not possible to resort to the permanent de-activation of just certain predetermined cylinders. If it is considered that five cylinders are present having the order of firing 1, 2, 4, 5, 3, this, in the case of fixed de-activation of the cylinders, could become 1, (2), 4, (5), 3, where the numbers in brackets indicate the inactive cylinders. It is evident that, whilst between the combustions 1-4 and 4-3 there are 288° of engine angle, between the ones corresponding to the sequence 3-1 there are only 144°. The system according to the invention makes it possible to overcome this type of problem easily, by providing an eight-stroke cycle. In practice, once again with reference to the example of five cylinders, the order of firing 1, 2, 4, 5, 3 becomes 1, (2), 4, (5), 3, (1), 2, (4), 5, (3), where, as above, the numbers in brackets indicate the inactive cylinders. It may be seen that in this case the periodicity of the cycle is twice that already specified above in the case of engines with an even number of cylinders.

According to a further peculiar characteristic of the invention, the aforesaid electronic control means with which the engine is provided are pre-arranged for performing an adjustment of the effective compression ratio (ECR) in order to obtain a control of combustion.

The phenomenon of combustion is controlled by the values of pressure and temperature that are reached at the end of the compression phase. Complete flexibility in management of the angle of closing of the intake valves, which is proper to the system of variable actuation of the valves with which the engine according to the invention is provided, enables a combustion cycle to be obtained in which the effective compression ratio (ECR) is independent of the geometrical compression ratio (GCR). A system that enables variation of the end-of-compression temperature, given the same pressure, through management of the effective compression ratio (ECR) is a system that can control combustion.

The engine according to the invention achieves the above purpose in two different possible modes:
1) by anticipating closing of the intake valve prior to bottom dead centre (early intake-valve closing); and
2) by retarding closing of the intake valve to exceed the angle of maximum volumetric efficiency of the engine (late intake-valve closing).

The system according to the invention affords the possibility of having a variable effective compression ratio and one that is used for every point of operation of the engine, and, at the same time, a geometrical compression ratio that is higher than the one normally to be found in petrol engines that adopt conventional distribution systems. In fact, the two compression ratios are independent of one another in that closing of the intake valves is not mechanically phased to the crank mechanism of the engine. The above is an advantage in so far as, if, on the one hand, the high partial loads ECR and GCR improve engine emission (faster and more stable combustion due to higher temperatures in the combustion chamber, and a smaller amount of unburnt fuel in the combustion chamber) and consumption (or efficiency of the cycle), on the other hand, thanks to the hydraulic system of variable control of the valves, it is possible, at full load, to set an ECR value such that the performance of the engine is not limited by the phenomenon of spark knock. This may occur, as mentioned previously, according to the two different modes described above. According to the first mode, associated to the early-intake-valve-closing strategy, to the reduction in the effective compression ratio, and to the consequent reduction in the end-of-compression temperature deriving therefrom, is an increase in the density of the fresh charge introduced through the use of a compressor. The charge drawn in will, at the end of the compression phase, be at a pressure similar to that of a conventional cycle, but since its temperature is lower (on account of the smaller effective compression ratio), it will enable a greater quantity of drawn charge to be entrapped and will be unfavourable to the onset of spark knock, with obvious benefits in terms of engine performance.

According to the second mode mentioned previously, the reduction in the effective compression ratio is obtained by retarding closing of the intake valve. The effect produced is similar to that of the first mode mentioned above.

According to a further preferred characteristic of the invention, the camshaft comprises cams with a profile such as to enable opening of the respective intake valves controlled by them not only during the conventional opening phase within the normal operating cycle of the engine, but also in some additional phases of the cycle. The aforesaid electronic control means are designed to cause opening of each solenoid valve so as to keep the respective intake valve closed during the above-mentioned conventional phase and/ or during one or more of said additional phases in which the respective cam would tend to cause opening of the valve, so that the engine may be made to function selectively according to different operating modules by controlling said solenoid valves.

Preferably, the electronic control means are designed to enable a second opening of the intake valve during the exhaust phase of a given cylinder so as to obtain intake of the hot gases that have flowed into the intake pipe during the subsequent induction phase, with consequent exhaust-gas recirculation (EGR).

The flexibility in management of the valves guaranteed by the hydraulic system of variable actuation of the valves makes it possible to manage exhaust-gas recirculation (EGR) at intake by means of the second opening of the intake valve during the exhaust phase. In this way, an internal EGR is obtained in so far as the engine exhaust gases, which have flowed into the intake pipe, are re-introduced into the combustion chamber in the course of the subsequent induction phase. The re-opening of the intake valve during the exhaust phase is obtained by profiling the cam with a second appropriately phased cam. Thanks to the hydraulic system of variable actuation of the valves, it is possible to activate/de-activate said second opening of the intake valve according to the different engine requirements. In practice, the second opening of the intake valve will be active at partial loads, in order to reduce harmful exhaust emissions, whilst outside the cycle area and in the power curve it will be de-activated in order not to penalize combustion and engine performance. The maximum amount of gas recirculated will be obtained by controlling the solenoid valves of the hydraulic system of variable actuation of the valves in order to enable the intake valve to follow completely the profile of the second cam (full lift), whilst, by appropriately de-energizing the solenoid valve, it will be possible to reduce/vary said amount as desired, thus obtaining an extremely fine adjustment of the internal EGR.

Thanks to the use of the aforesaid hydraulic system of variable actuation of the valves, the engine according to the invention is moreover able to implement different strategies that enable the desired effects to be obtained in terms of reduction in consumption and in harmful exhaust emissions, etc., in a petrol engine.

BRIEF DESCRIPTION OF THE DRAWINGS

These and further details will emerge from the ensuing description, with reference to the attached drawings, which are provided purely by way of non-limiting example, and in which.

DETAILED DESCRIPTION OF THE INVENTION

Figure 1:
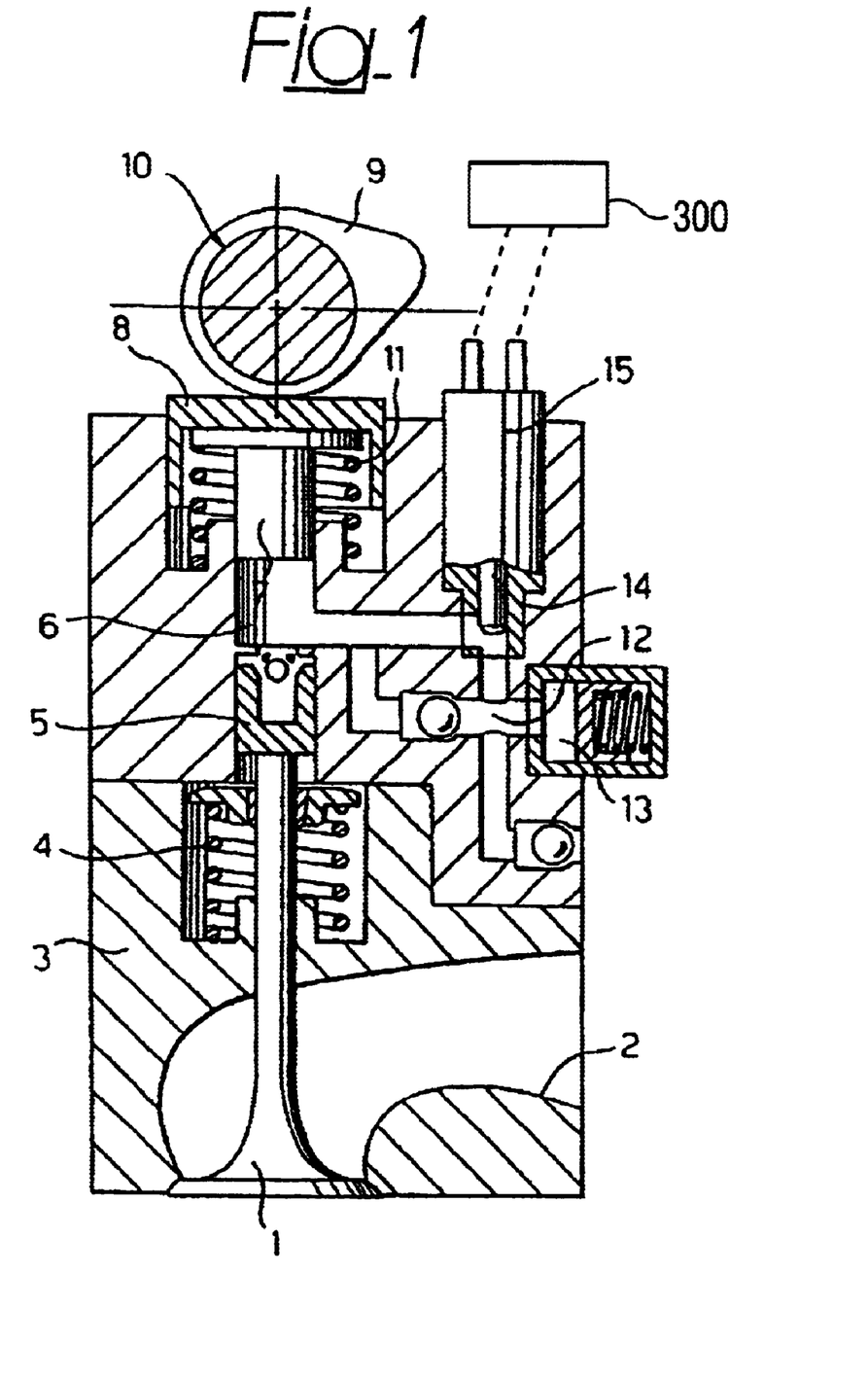
FIGS. 1 and 1A are schematic illustrations of the aforesaid hydraulic system of variable actuation of the valves, of the type used in the engine according to the present invention.

In the drawing of FIG. 1, the reference number 1 designates as a whole the intake valve associated to a respective intake pipe 2 made in a cylinder head 3 of a petrol engine.

The valve is recalled into its closed position (upwards, as viewed in FIG. 1) by a spring 4, whilst it is forced to open by a piston 5 acting on the top end of the stem of the valve. The position 5 in turn is controlled, via oil under pressure, which is present inside a chamber 6, by a piston 7 which supports a cup or bucket 8 co-operating with a cam 9 of the camshaft 10. The cup 8 is held by a spring 11 in sliding contact with the cam 9. The pressure chamber 6 may be connected to a pipe 12, which in turn communicates with a pressure accumulator 13 iva the open-close element 14 of a solenoid valve 15, which is controlled by a electronic control means 300 according to the operating conditions of the engine. When the solenoid valve 15 is opened, the oil under pressure, which is present in the chamber 6, is discharged, so that the valve 1 closes rapidly under the action of the return spring 4.

When the solenoid valve 15 is closed, the oil present in the chamber 6 transmits the movements from the piston 7 to the piston 5 and consequently to the valve 1, so that the position of the valve 1 is determined by the cam 9. In other words, the cam 9 normally controls opening of the valve 1 according to a cycle that depends upon the profile of the cam, but the intake valve can be disabled, whenever required, by opening the solenoid valve 15 so as to interrupt the connection between the piston 7 and the valve 1. The present invention refers to the application of a system of variable actuation of the valves of the type described above to a multicylinder petrol engine.

Figure 1A:
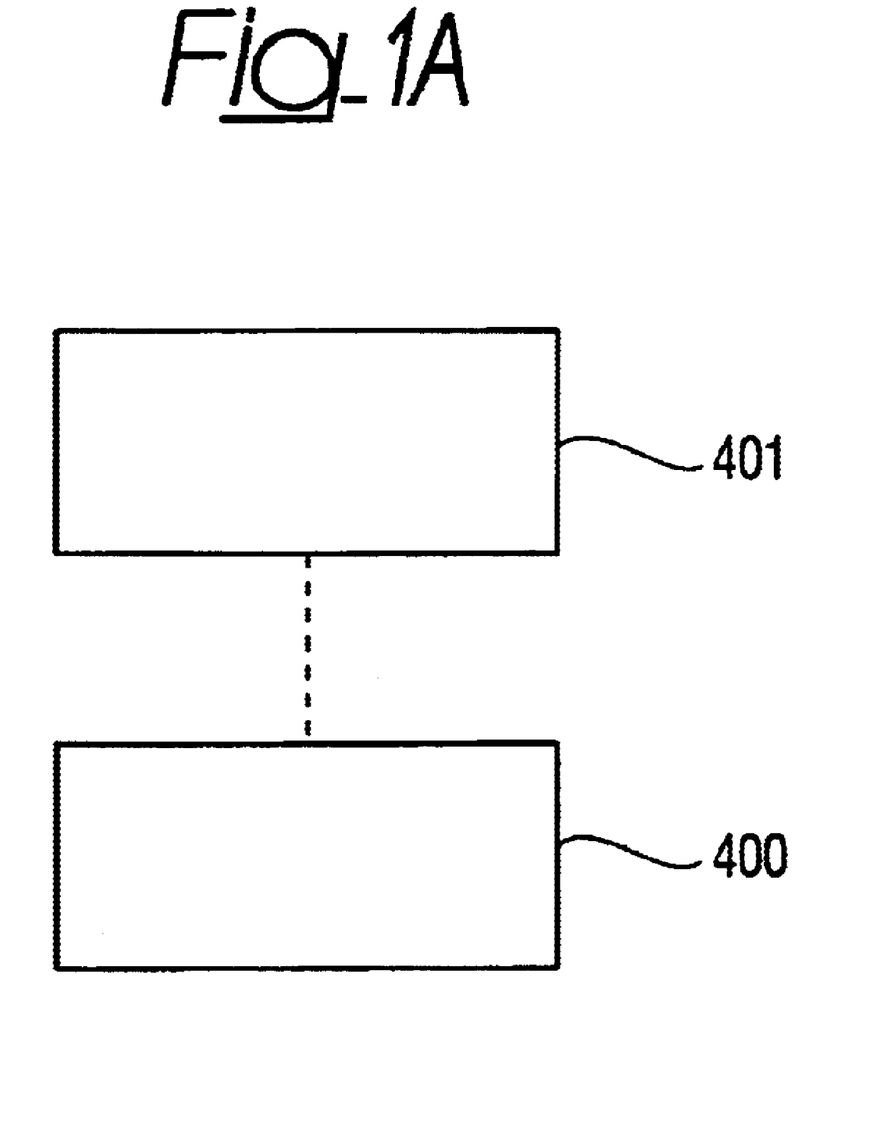

As already mentioned previously, the electronic control means can be pre-arranged for obtaining a modular operation of the engine by inhibiting one or more selected cylinders by means of closing of the intake valves, using a hydraulic system of variable actuation of the valves, and of the exhaust valves 400 (FIG. 1A) by means of an electronically controlled actuator 401. In addition, as has also already been amply illustrated previously, the electronic control means are pre-arranged for achieving a control of combustion by adjustment of the effective compression ratio (ECR) and a control of internal exhaust-has recirculation (EGR) by means of a second opening of the intake valve, which is obtained by exploiting a second cam 9a (see FIG. 1) of the cam 9 (not present in FIG. 1).

The electronic control means are moreover pre-arranged for obtaining a plurality of different adjustments of the intake valves. Each intake valve may undergo three adjustments: retarded opening, anticipated closing, and retarded opening plus anticipated closing. If two intake valves are provided for each cylinder, the aforesaid three possible basic adjustments can be combined together in various flexible ways, giving rise to ten different modes of valve management, which are chosen according to the desired adjustments in terms of pumping, turbulence inside the combustion chamber, and motions inside the combustion chamber.

Obviously, in the case of cylinders with three or more intake valves, the possible combinations increase. In what follows, the ten different modes of adjustment of the two intake valves associated to each cylinder are specifically described.

Figure 2:
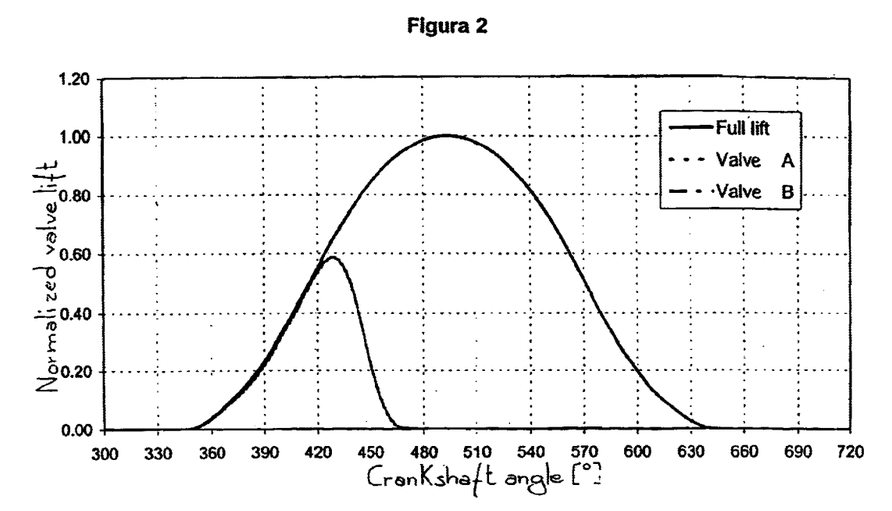
FIGS. 2 to 11 illustrate various modes of adjustment of the two intake valves of an engine cylinder.

1) Anticipated closing of both intake valves: closing of both intake valves is anticipated and with equal lift (see FIG. 2). This mode enables low values of pumping and of turbulence in the combustion chamber to be achieved and consequently a reduction in consumption and in $NO_x$ at exhaust.

Figure 3:
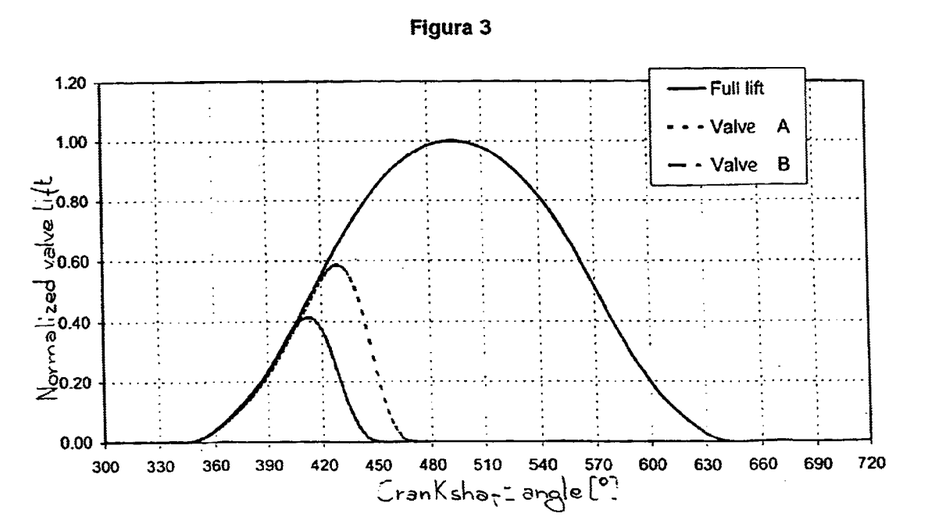

2) Anticipated closing of both intake valves with different valve lift (see FIG. 3). This mode enables a motion of inclined swirl to be created in the combustion chamber and to manage it with the valve that has the lower lift, at the same time, however, keeping the pumping values low.

Figure 4:
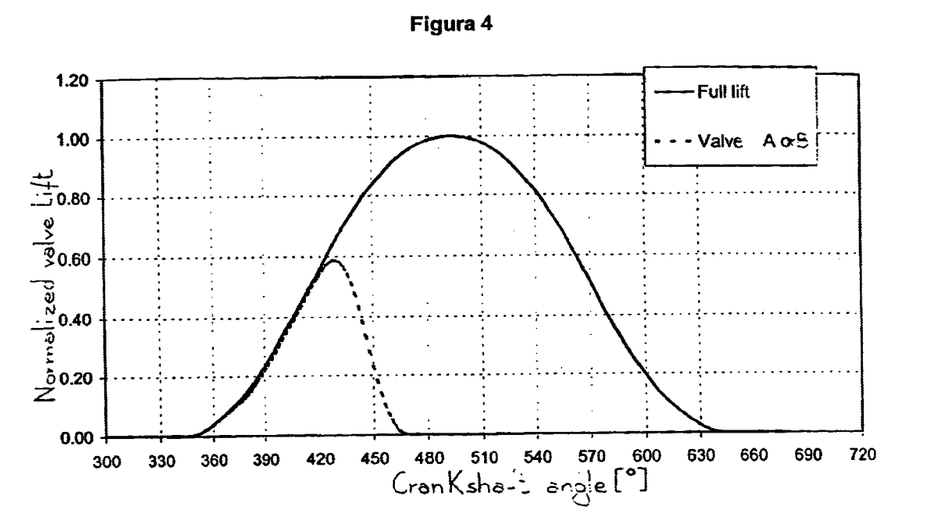

3) Alternate anticipated closing of the intake valves (see FIG. 4): both of the intake valves undergo anticipated closing, but only one of them opens alternately for each engine cycle. This mode enables a slight increase in turbulence in the combustion chamber, generating a motion of inclined swirl, but without the possibility of managing it. The advantage derives from the possibility of controlling the air with just one intake valve, thus halving consumption of electricity, reducing the torque absorbed by the distribution and at the same time using a double-jet injector and separate intake pipes. The value of the work of pumping is in any case kept low.

Figure 5:
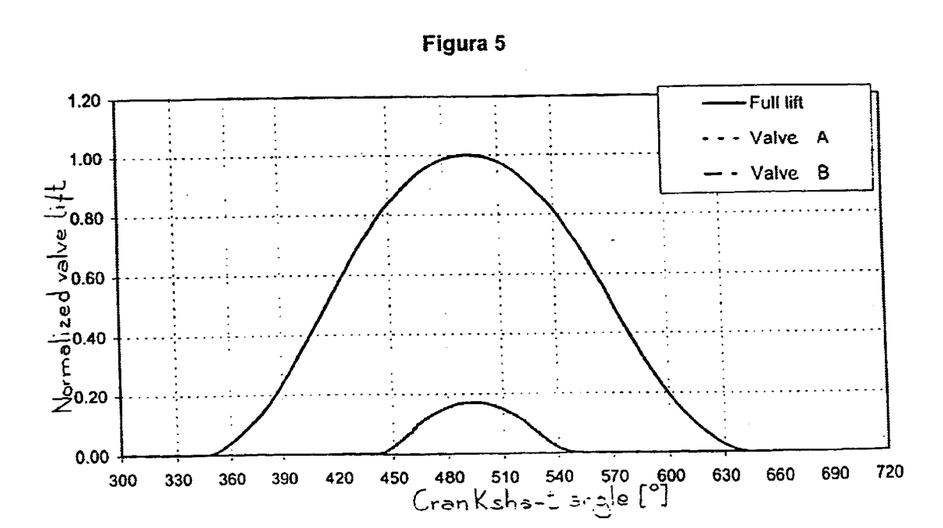

4) Retarded opening of the intake valves (see FIG. 5): opening of both valves is retarded, after which the valves follow the cam profile, performing full lifts according to the angle of opening set. This mode enables high pumping values to be achieved and is useful for managing the engine brake. Thanks to the small values of valve lift, a laminar motion is set up through the valve, generated by the high pressure differential between upstream of the valve and downstream thereof. The management of the angle of opening of the valve during idling enables a more stable control of the running conditions and a reduction in noise.

Figure 6:
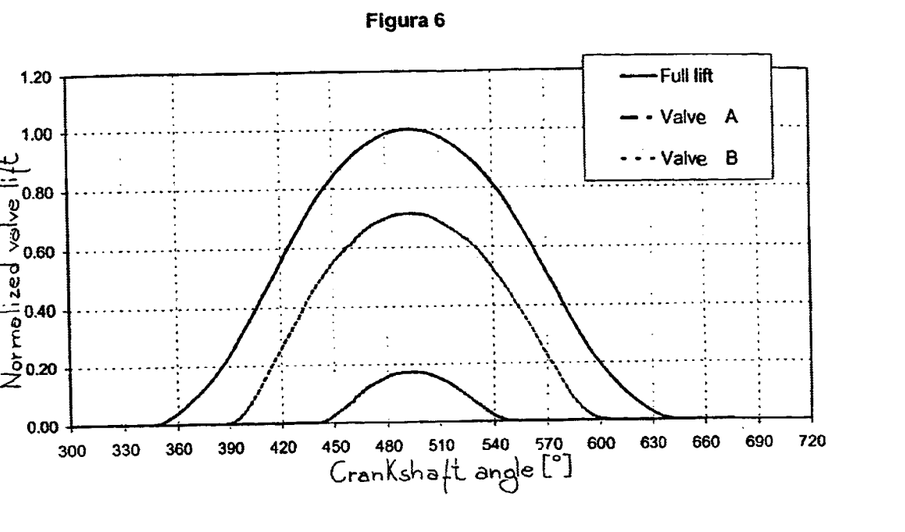

5) Retarded opening of the intake valves with different valve lift: opening of both valves is retarded but with different valve lifts (see FIG. 6). This mode enables a motion of inclined swirl to be created in the combustion chamber, associated, in the presence of small lifts of a valve, to a laminar motion. It is possible to control these motions with the valve that has the lower lift. This management moreover enables a reduction in noise at idling and a high pumping.

Figure 7:
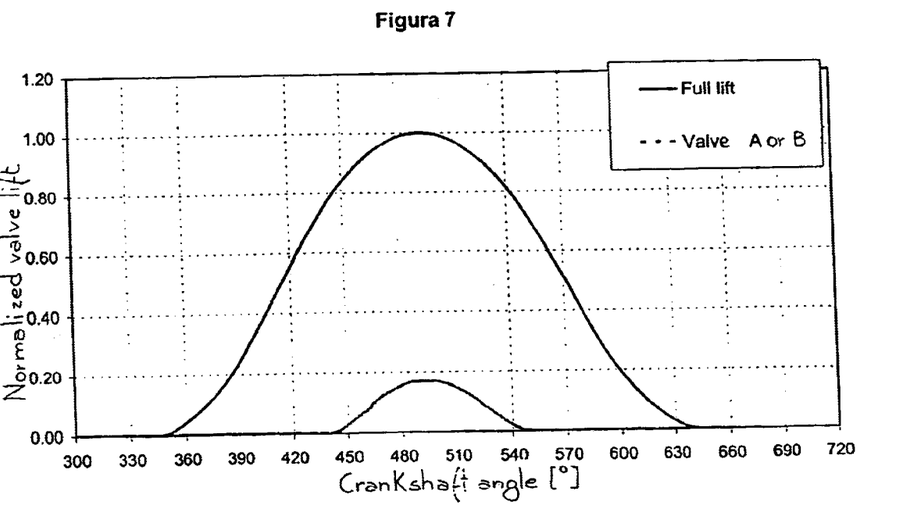

6) Alternated retarded opening of the intake valves (see FIG. 7): opening of both valves is retarded, but only one valve is opened alternately per engine cycle. This mode enables a motion of inclined swirl to be created in the combustion chamber, but without the possibility of managing it. The advantage derives from the possibility of controlling the air with just one intake valve, thus halving consumption of electricity and, at the same time, using a double-jet injector and separate intake valves. This management moreover enables a reduction in noise at idling and a high pumping.

Figure 8:
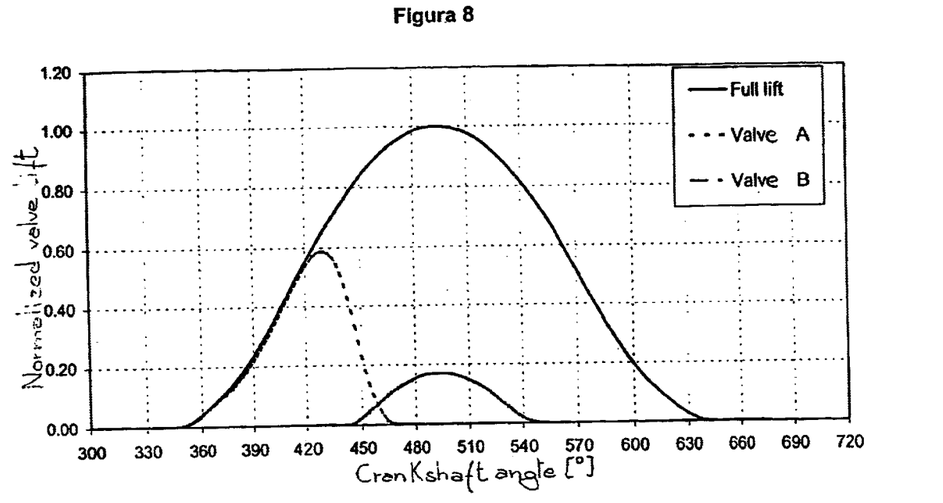

7) Mixed control: retarded opening of one intake valve (see FIG. 8), and anticipated opening of the other intake valve. This mode bestows extreme flexibility on the system. In fact, with retardation in valve opening, for small valve lifts, there is obtained a laminar motion of the charge through the valve, whereas anticipated closing of the valve enables setting-up of a motion of swirl. The combination of these two motions improves the efficiency of combustion, with consequent benefits in terms of fuel consumption.

Figure 9:
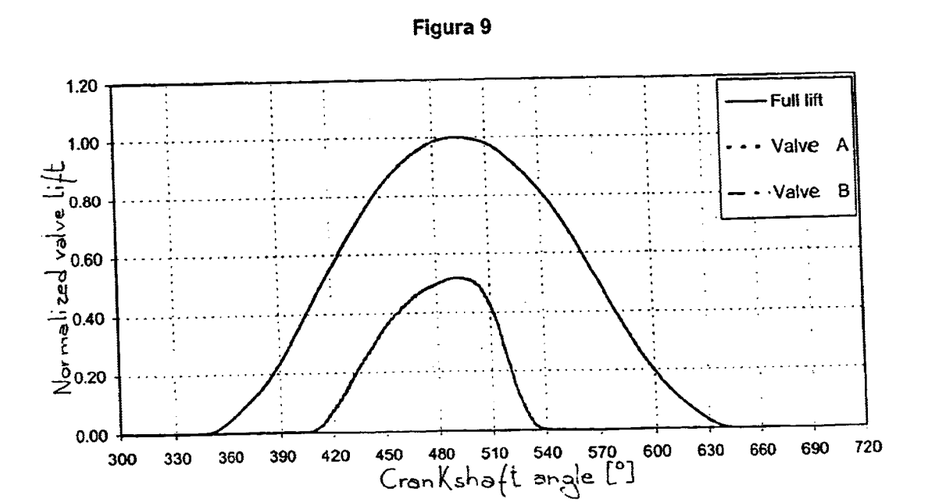

8) Retarded opening/anticipated closing: both valves are managed by imposing both a retarded opening and an anticipated closing, performing the same valve lift (see FIG. 9). The retarded opening generates a slight pumping, but also turbulence in the combustion chamber, which improves efficiency of combustion, with consequent benefits in terms of fuel consumption.

Figure 10:
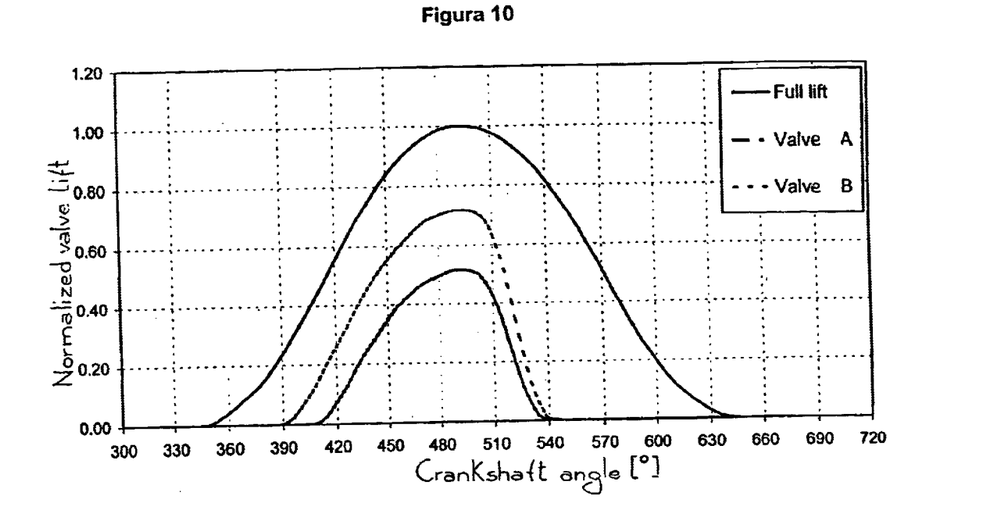

9) Retarded opening/anticipated closing with different valve lifts (see FIG. 10): both valves are managed by imposing both a retarded opening and an anticipated closing, but performing different valve lifts because, between the two valves, the angles of opening and/or closing are different. The retarded opening generates a certain amount of pumping, but also turbulence in the combustion chamber, which improves efficiency of combustion, with consequent benefits in terms of fuel consumption.

Figure 11:
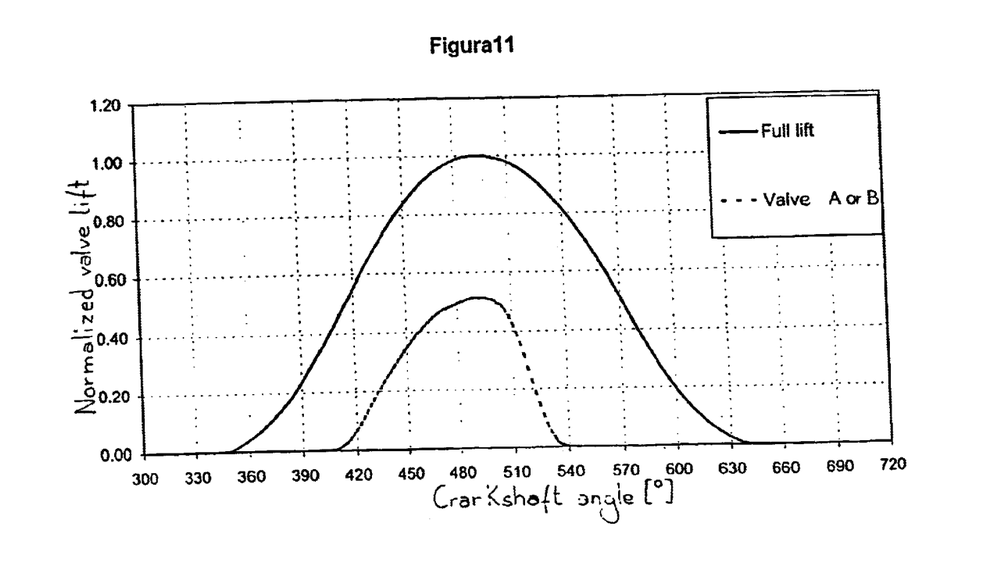

10) Alternate retarded opening/anticipated closing (see FIG. 11): both valves are managed by imposing both a retarded opening and an anticipated closing, but only one valve is opened alternately per engine cycle. The retarded opening generates a certain amount of pumping, but also turbulence in the combustion chamber, which improves efficiency of combustion, with consequent benefits in terms of fuel consumption. A further advantage derives form the possibility of controlling the air with just one intake valve, thus halving consumption of electricity and, at the same time, using a double-jet injector and separate intake pipes.

FIGS. 2 to 11 show the diagrams of valve lifts in the different modes of operation described above. The dashed line indicates the theoretical diagram of valve lift (valve displacement as a function of engine angle) due to the geometry of the cam. The solid line indicates the diagram of the effective valve lifts.

Of course, without prejudice to the principle of the invention, the details of construction and the embodiments may vary widely with respect to what is described and illustrated purely by way of example, without thereby departing from the scope of the present invention.

What is claimed is:

1. A multicylinder petrol engine, comprising:

at least one intake valve and at least one exhaust valve for each cylinder, each valve being provided with respective elastic return means, which push the valve towards a closed position for controlling respective intake and exhaust pipes; and at least one camshaft, for actuating the intake valves and exhaust valves of the engine cylinders by means of respective tappets;

in which each intake valve is controlled by the respective tappet against the action of the elastic return means by interposition of hydraulic means that include a pressurized fluid chamber;

said pressurized fluid chamber being designed to be connected by means of a solenoid valve to an exhaust channel in order to uncouple the valve from the respective tappet and bring about fast closing of the valve as a result of the respective elastic return means;

electronic control means for controlling each solenoid valve so as to vary the time and the stroke of opening of the respective intake valve according to one or more operating parameters of the engine;

wherein said engine comprises second electronic control means for keeping the exhaust valves of pre-set engine cylinders closed, and in that said electronic control means are pre-arranged for keeping the intake valves of selected cylinders of the engine closed, simultaneously with the activation of the means for keeping the exhaust valves closed, so as to inhibit operation of said selected cylinders.

2. The engine according to claim 1, wherein said engine has an even number of cylinders and in that said electronic control means are pre-arranged for deactivating one half of the engine cylinders.

3. The engine according to claim 1, wherein said engine has an odd number of cylinders and said electronic control means are pre-arranged for deactivating, by turns, all the cylinders of the engine in such a way as to maintain the uniformity of staggering between the individual combustion phases.

4. The engine according to claim 1, wherein said electronic control means are pre-arranged for adjusting the effective compression ratio of the engine by anticipating closing of the intake valve prior to bottom dead centre and by retarding closing of the intake valve to exceed the angel of maximum volumetric efficiency of the engine.

5. The engine according to claim 1, wherein the cam of the camshaft of the engine, which controls each intake valve, has a profile such as to tend to bring about opening of said intake valve not only during the conventional opening phase within the normal operating cycle of the engine, but also in at least one additional phase of the cycle, and in that said electronic control means are pre-arranged for enabling said second opening of the intake valve during the exhausts phase, so as to obtain an induction into the combustion chamber of the hot gases that have flowed into the intake pipe during the subsequent induction phase.

\* \* \* \* \*